United States Patent
Chiba

(10) Patent No.: US 10,924,576 B2
(45) Date of Patent: Feb. 16, 2021

(54) RELAY APPARATUS, CLIENT APPARATUS, DATA RELAY METHOD, AND PROGRAM STORAGE MEDIUM IN WHICH COMPUTER-READABLE PROGRAM IS STORED

(71) Applicant: NEC Corporation, Tokyo (JP)

(72) Inventor: Yasunobu Chiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/345,289

(22) PCT Filed: Nov. 13, 2017

(86) PCT No.: PCT/JP2017/040812
§ 371 (c)(1),
(2) Date: Apr. 26, 2019

(87) PCT Pub. No.: WO2018/092734
PCT Pub. Date: May 24, 2018

(65) Prior Publication Data
US 2019/0273797 A1 Sep. 5, 2019

(30) Foreign Application Priority Data
Nov. 15, 2016 (JP) .................................. 2016-222585

(51) Int. Cl.
*H04L 29/08* (2006.01)
*G06F 13/00* (2006.01)

(52) U.S. Cl.
CPC .......... *H04L 67/2823* (2013.01); *G06F 13/00* (2013.01); *H04L 67/2814* (2013.01); *H04L 67/2842* (2013.01); *H04L 67/322* (2013.01)

(58) Field of Classification Search
CPC ............ H04L 67/2814; H04L 67/2823; H04L 67/2842; H04L 67/322; G06F 13/00
See application file for complete search history.

(56) References Cited

U.S. PATENT DOCUMENTS 5,522,041 A 5/1996 Murakami et al.
6,256,676 B1 7/2001 Taylor et al.
(Continued)

FOREIGN PATENT DOCUMENTS

JP H06-181501 A 6/1994
JP H06-326856 A 11/1994
(Continued)

OTHER PUBLICATIONS

International Search Report for PCT Application No. PCT/JP2017/040812, dated Jan. 30, 2018.

*Primary Examiner* — Benjamin M Thieu

(57) ABSTRACT

A relay apparatus includes: a data request part which requests, based on a data acquisition request(s) from a data request source(s), a data provision apparatus(es) that provides data by using a predetermined application programming interface(s) to transmit data; a conversion instruction part which transmits a conversion rule(s) for data transmitted from the data provision apparatus(es) to the data request source(s) and instructs the data request source(s) to convert the data transmitted from the data provision apparatus(es); and a data forwarding part which forwards data transmitted from the data provision apparatus(es) to the data request source(s).

19 Claims, 14 Drawing Sheets

(56) References Cited

U.S. PATENT DOCUMENTS

| | | | |
|---|---|---|---|
| 2008/0195753 A1* | 8/2008 | Shimada | H04L 65/1006 |
| | | | 709/238 |
| 2009/0327394 A1* | 12/2009 | Kaji | H04L 67/2823 |
| | | | 709/201 |
| 2013/0242994 A1* | 9/2013 | Hamada | H04L 67/2823 |
| | | | 370/390 |
| 2018/0060741 A1* | 3/2018 | Sakai | G06F 16/00 |

FOREIGN PATENT DOCUMENTS

| | | |
|---|---|---|
| JP | H10-207722 A | 8/1998 |
| JP | 2002-530732 A | 9/2002 |
| JP | 2013-145436 A | 7/2013 |

* cited by examiner

FIG. 5

| Method | Path | Server URI |
|---|---|---|
| GET | /api/v1/data | https://10.0.0.1/api/v3/data |
| GET | /api/v1/data/{id} | https://10.0.0.1/api/v3/data/{id} |
| GET | /api/v1/users | https://10.0.0.2/api/v1/users |
| GET | /api/v1/users/{id} | https://10.0.0.2/api/v1/users/{id} |
| ... | ... | ... |
| GET | /api/v1/logs | https://10.0.0.255/api/v2/log/messages |

FIG. 6

| Method | Path | CONVERSION RULE |
|---|---|---|
| GET | /api/v1/data | [.[]| .id] |
| GET | /api/v1/users | [.[]| .id] |
| : | : | : |
| GET | /api/v1/logs | [.[0:100][]| .message] |

RELAY APPARATUS, CLIENT APPARATUS, DATA RELAY METHOD, AND PROGRAM STORAGE MEDIUM IN WHICH COMPUTER-READABLE PROGRAM IS STORED

FIELD

Reference to Related Application

This application is a National Stage Entry of PCT/JP2017/040812 filed on Nov. 13, 2017, which claims priority from Japanese Patent Application 2016-222585 filed on Nov. 15, 2016, the contents of all of which are incorporated herein by reference, in their entirety.

The present invention relates to a relay apparatus, a client apparatus, a data relay method, and a program. In particular, it relates to: a relay apparatus that requests, based on a request(s) from a data request source apparatus(es), a data provision source(s) to transmit data to the data request source(s); a client apparatus; a data relay method; and a program storage medium in which a computer-readable program is stored.

BACKGROUND

PTL (Patent Literature) 1 discloses a control apparatus that enables systems with different specifications to use a common API (an application program interface). Specifically, this control apparatus includes storage means for storing information indicating whether to perform first conversion in which information transmitted from a processing apparatus (a data request source) is converted into information in an input format for an API (a data provision source) and information indicating whether to perform second conversion in which information outputted from the API is converted into information in an input format for the processing apparatus. When the control apparatus receives information transmitted from the processing apparatus (the data request source), the transmitted information including an identifier of the processing apparatus or an identifier of a user of the processing apparatus, the control apparatus determines whether to convert the transmitted information and whether to convert information to be outputted by the control apparatus based on the identifier and performs conversion, depending on the determination result.

PTL 2 discloses a program division execution method directed to a computer system in which a plurality of low-cost and multimedia-compatible client computers share a plurality of server computers. In this method, a single program is divided into two parts, one part being executed on an individual client computer and the other part being executed on an individual server computer. In addition, load balancing can be realized for the server computers.

PTL 3 discloses a distributed enterprise application integration system that provides a reliable store-and-forward messaging system, a capable message brokering facility, and a strong agent-adapter architecture for integrating disparate enterprise applications.

In addition, companies providing various services on the Internet have recently released Web APIs with which their customers can acquire data from servers, etc. of these companies via networks.

PTL 1: Japanese Patent Kokai Publication No. JP2013-145436A
PTL 2: Japanese Patent Kokai Publication No. JP-H10-207722A
PTL 3: Japanese Translation of PCT International Application Publication No. JP2002-530732A

SUMMARY

The following analysis has been made by the present inventor. As disclosed in PTL 1, the Web API specifications vary from company to company. To use a common API (an application program interface), a relay apparatus (which is referred to as "a control apparatus" in PTL 1) is needed. However, problems arise when such a relay apparatus is used. First, it is necessary to convert data transmitted from various data provision sources. Second, it is necessary to ensure resources such as a memory in which the data necessary for the conversion processing needs to be stored temporarily. For example, the control apparatus in PTL 1 performs second conversion in which information outputted from an API (a data provision source) is converted into information in an input format for the processing apparatus. In addition, even when the control apparatus in PTL 1 is not used, for example, there are case in which numerical data transmitted from a data provision source is converted into information in a display format easily viewable by humans. However, if the memory for temporarily storing the data transmitted from a data provision source becomes insufficient, the data conversion processing cannot be performed, and the data cannot be transmitted to the corresponding data request source. In particular, when a large amount of data needs to be forwarded, the problem of a lack of memory becomes apparent.

PTL 3, which provides an enterprise application integration environment, does not discloses a solution to the data conversion processing and the lack of memory needed for the data conversion processing, either. PTL 2 discloses transmission of an API function from the server computer side to the client computer side and execution of the API function on the client computer side. However, to perform this processing, a library such as Win32 subsystem of Microsoft Corporation (registered trademark) is also needed on the client computer side.

It is an object of the present invention to provide a relay apparatus, a client apparatus, a data relay method, and a program that contribute to reduction of the load on and the memory usage of the relay apparatus that relays data transmitted from a data provision source(s) in a configuration in which a data provision technique such as the above Web API is used.

According to a first aspect, there is provided a relay apparatus, including a data request part configured to request, based on a data acquisition request(s) from a data request source(s), a data provision apparatus(es) that provides data by using a predetermined application programming interface(s) to transmit data. This relay apparatus also includes a conversion instruction part configured to transmit a conversion rule(s) for data transmitted from the data provision apparatus(es) to the data request source(s) and instructs the data request source(s) to convert the data transmitted from the data provision apparatus(es). In addition, the relay apparatus includes a data forwarding part configured to forward data transmitted from the data provision apparatus(es) to the data request source(s).

According to a second aspect, there is provided a client apparatus, including: a data acquisition request part configured to transmit, based on an instruction from a user, a data acquisition request to a data provision apparatus that provides data by using a predetermined application programming interface via a predetermined relay apparatus; and a conversion execution part configured to convert, when the client apparatus receives a conversion rule for data transmitted from the data provision apparatus from the predetermined relay apparatus that has transmitted the data acquisition request, the data transmitted from the data provision apparatus, based on the conversion rule for the data.

According to a third aspect, there is provided a data relay method, comprising: requesting, based on a data acquisition request(s) from a data request source(s), a data provision apparatus(es) that provides data by using a predetermined application programming interface(s) to transmit data; transmitting a conversion rule(s) for data transmitted from the data provision apparatus(es) to the data request source(s); forwarding data transmitted from the data provision apparatus(es) to the data request source(s); and instructing the data request source(s) to convert the data transmitted from the data provision apparatus(es). The present method is associated with a certain machine, which is a relay apparatus that requests, based on a data acquisition request(s) from a data request source(s), a data provision apparatus(es) that provides data by using a predetermined application programming interface(s) to transmit data.

According to a fourth aspect, there is provided a program, causing a computer, which constitutes a relay apparatus that requests, based on a data acquisition request(s) from a data request source(s), a data provision apparatus(es) that provides data by using a predetermined application programming interface(s) to transmit data, to perform processing for: requesting, based on the data acquisition request(s) from the data request source(s), the data provision apparatus(es) to transmit data by using the predetermined application programming interface(s); transmitting a conversion rule(s) for data transmitted from the data provision apparatus(es) to the data request source(s); and forwarding data transmitted from the data provision apparatus(es) to the data request source(s). This program can be stored in a computer-readable (non-transient) storage medium. Namely, the present invention can be embodied as a computer program product.

The meritorious effects of the present invention are summarized as follows.

The present invention contributes to reduction of the load on and the memory usage of a relay apparatus that relays data transmitted from a data provision source(s). Namely, the present invention converts a relay apparatus that relays data transmitted from a data provision source(s) into a relay apparatus having less load and less memory usage.

BRIEF DESCRIPTION OF THE DRAWINGS

FIG. 5 illustrates an example of request conversion rules stored in the relay apparatus according to the first example embodiment of the present disclosure.

FIG. 6 illustrates an example of data conversion rules stored in the relay apparatus according to the first example embodiment of the present disclosure.

MODES

Figure 1:
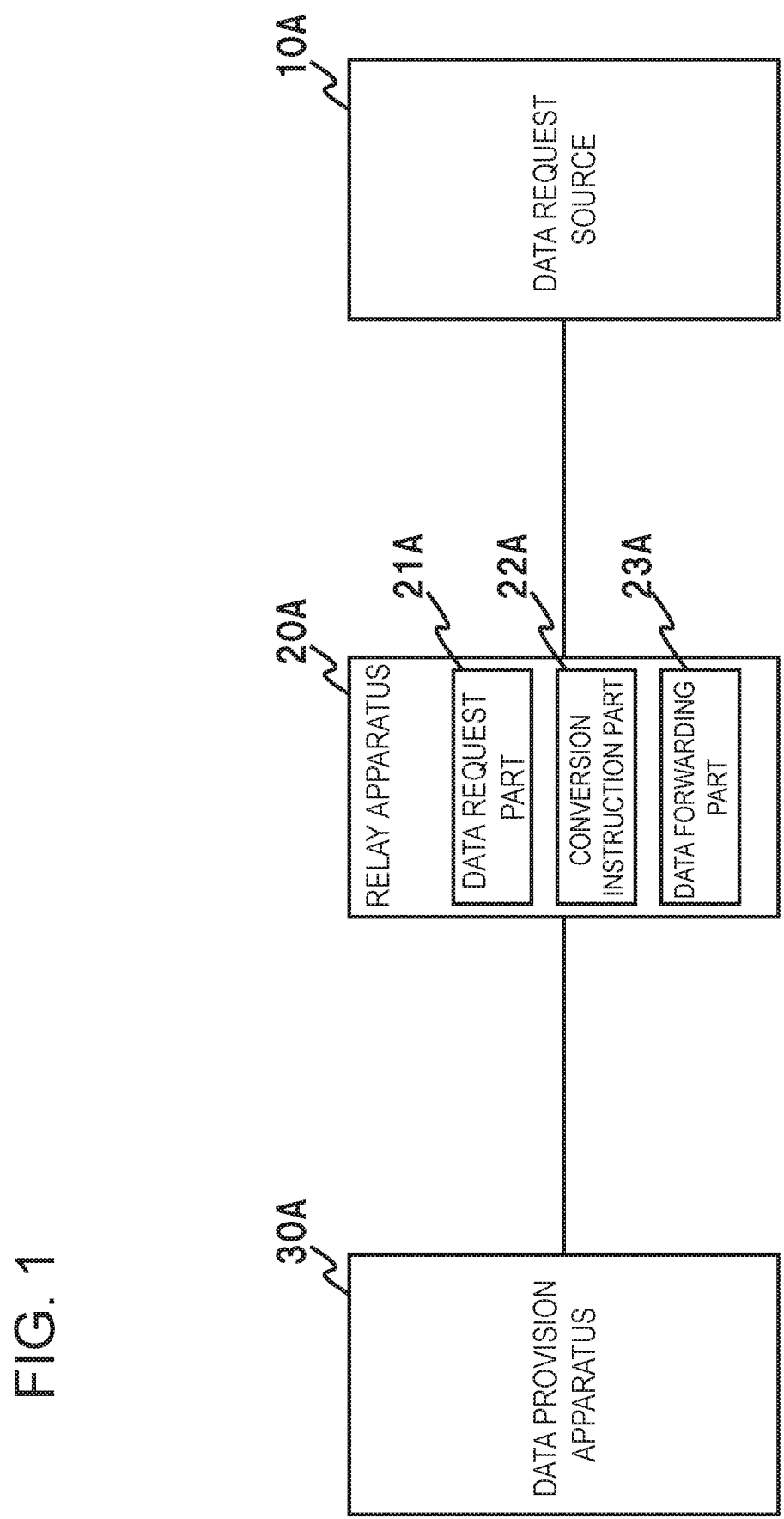
FIG. 1 illustrates a configuration according to an example embodiment of the present disclosure.

First, an outline of an example embodiment of the present disclosure will be described with reference to drawings. In the following outline, various components are denoted by reference characters for the sake of convenience. Namely, the following reference characters are merely used as examples to facilitate understanding of the present disclosure, not to limit the present disclosure to the illustrated modes. An individual connection line between blocks in a drawing or the like to which the following description refers signifies both one-way and two-way directions. An individual arrow schematically illustrates the principal flow of a signal (data) and does not exclude bidirectionality. In the following description, "A and/or B" will be used to signify at least one of A and B.

As illustrated in FIG. 1, an example embodiment of the present disclosure can be realized by a relay apparatus 20A that relays data between a data provision apparatus 30A and a data request source 10A. The relay apparatus 20A includes a data request part 21A, a conversion instruction part 22A, and a data forwarding part 23A.

Figure 2:
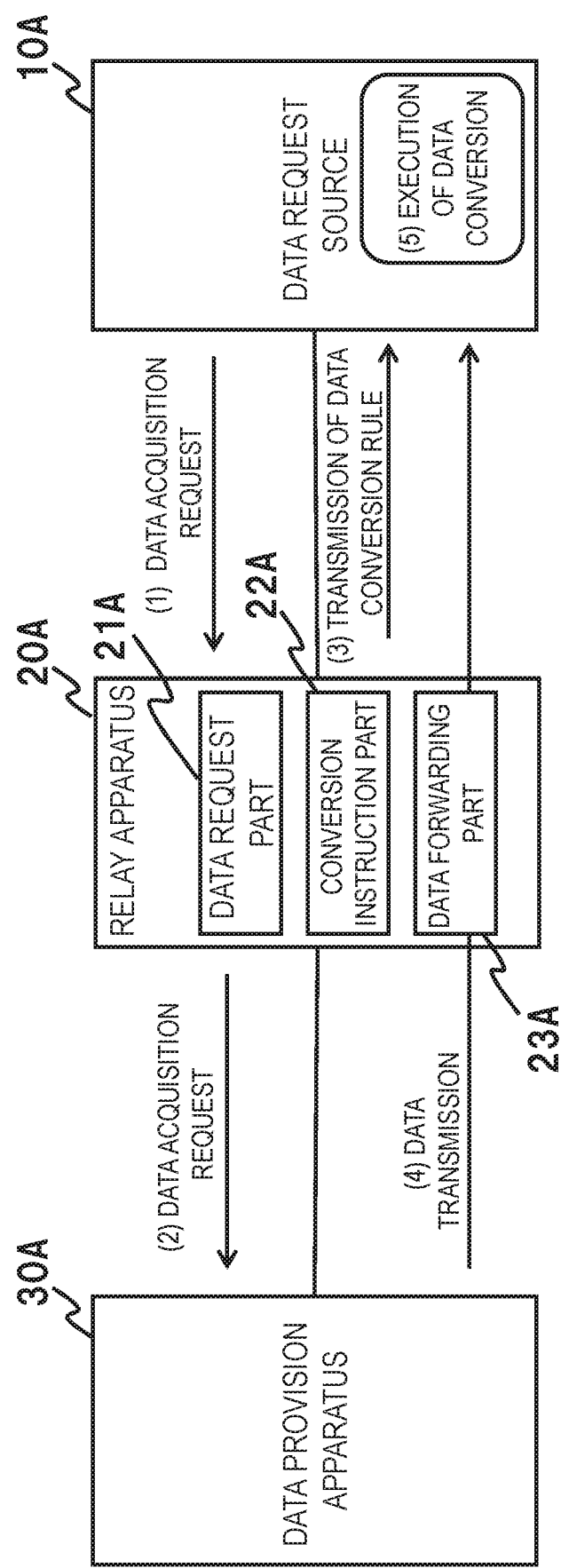
FIG. 2 illustrates an operation according to the example embodiment of the present disclosure.

More specifically, as illustrated in FIG. 2, the data request part 21A requests, based on a data acquisition request (1) from the data request source 10A, the data provision apparatus 30A that provides data by using a predetermined application programming interface to transmit data (a data acquisition request (2)). By transmitting a conversion rule for converting the data transmitted from the data provision apparatus 30A to the data request source 10A, the conversion instruction part 22A instructs the data request source 10A to convert the data transmitted from the data provision apparatus 30A ((3) transmission of a data conversion rule). The data forwarding part 23A forwards the data transmitted from the data provision apparatus 30A to the data request source 10A ((4) data transmission). Based on the data conversion rule received from the relay apparatus 20A, the data request source 10A converts the data transmitted from the data provision apparatus 30A.

As seen from the above operation, the present disclosure can cause the data request source 10A to perform the data conversion processing, which is performed on the relay apparatus side in PTL 1, etc. In this way, the load on and the memory usage of the relay apparatus 20A can be reduced.

Depending on the content of the data acquisition request from the data request source 10A, a large amount of data could be transmitted from the data provision apparatus 30A. However, according to the present disclosure, since conversion processing that uses a lot of resources of the relay apparatus 20A can be omitted, the above advantageous effect can be increased further.

First Example Embodiment

Figure 3:
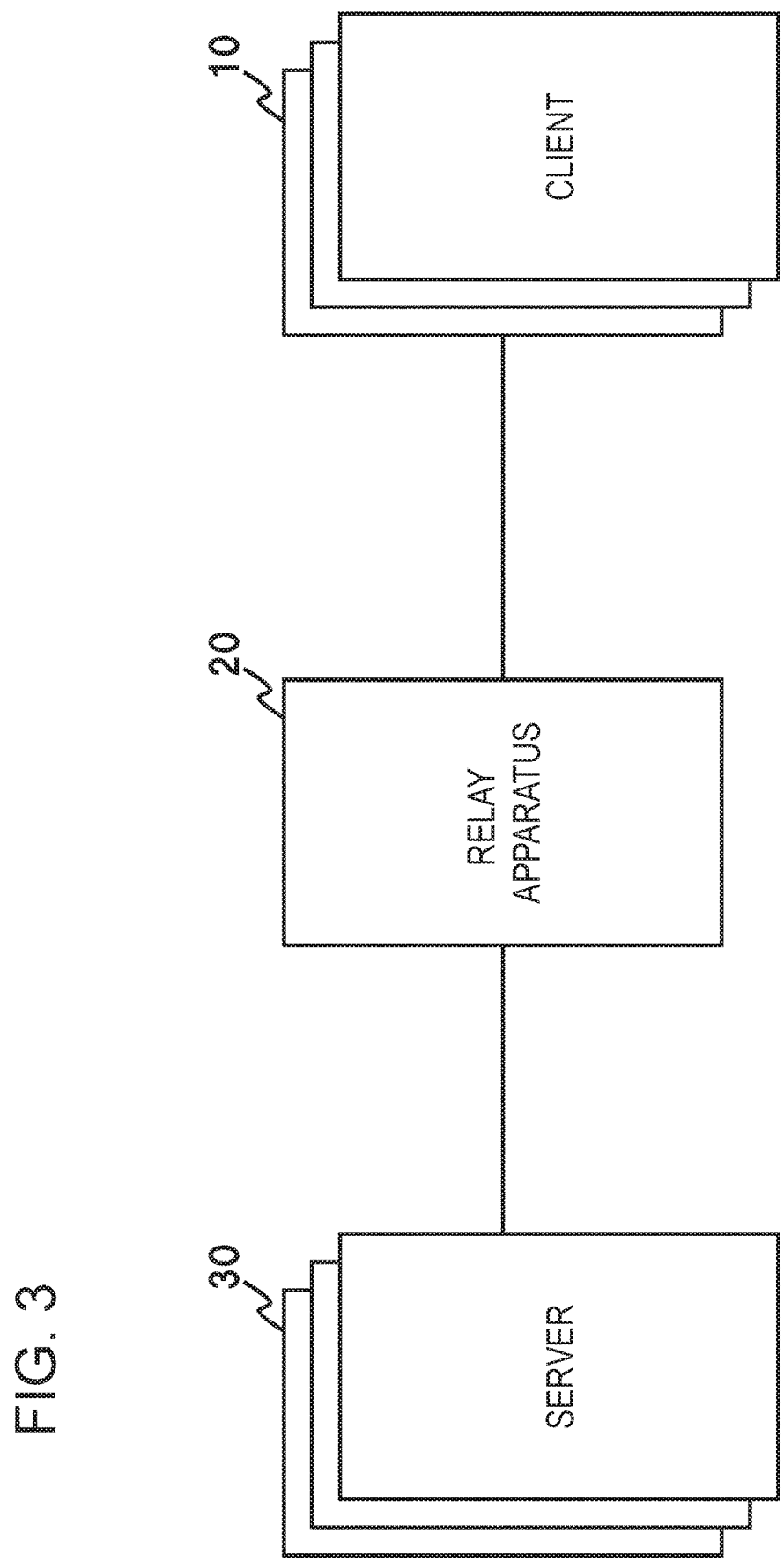
FIG. 3 illustrates a configuration of a data provision system according to a first example embodiment of the present disclosure.

Next, a first example embodiment of the present disclosure will be described in detail with reference to drawings. FIG. 3 illustrates a configuration of a data provision system according to a first example embodiment of the present disclosure. As illustrated in FIG. 3, a relay apparatus 20 is arranged between a client 10 serving as a data request source and a server 30 serving as a data provision source.

The server 30 provides data to external sites, etc. by using a Web API (the external sites, etc. will collectively be referred to as "clients 10"). The configuration may include a plurality of servers 30, and each of the servers 30 may adopt a different Web API specification.

A client 10 transmits an HTTP (HyperText Transfer Protocol) request to a server 30 via the relay apparatus 20. The client 10 receives data in the form of an HTTP response from the server 30 via the relay apparatus 20 and uses the data.

The relay apparatus 20 is an apparatus that relays data exchange using a Web API between the client 10 and the server 30.

Figure 4:
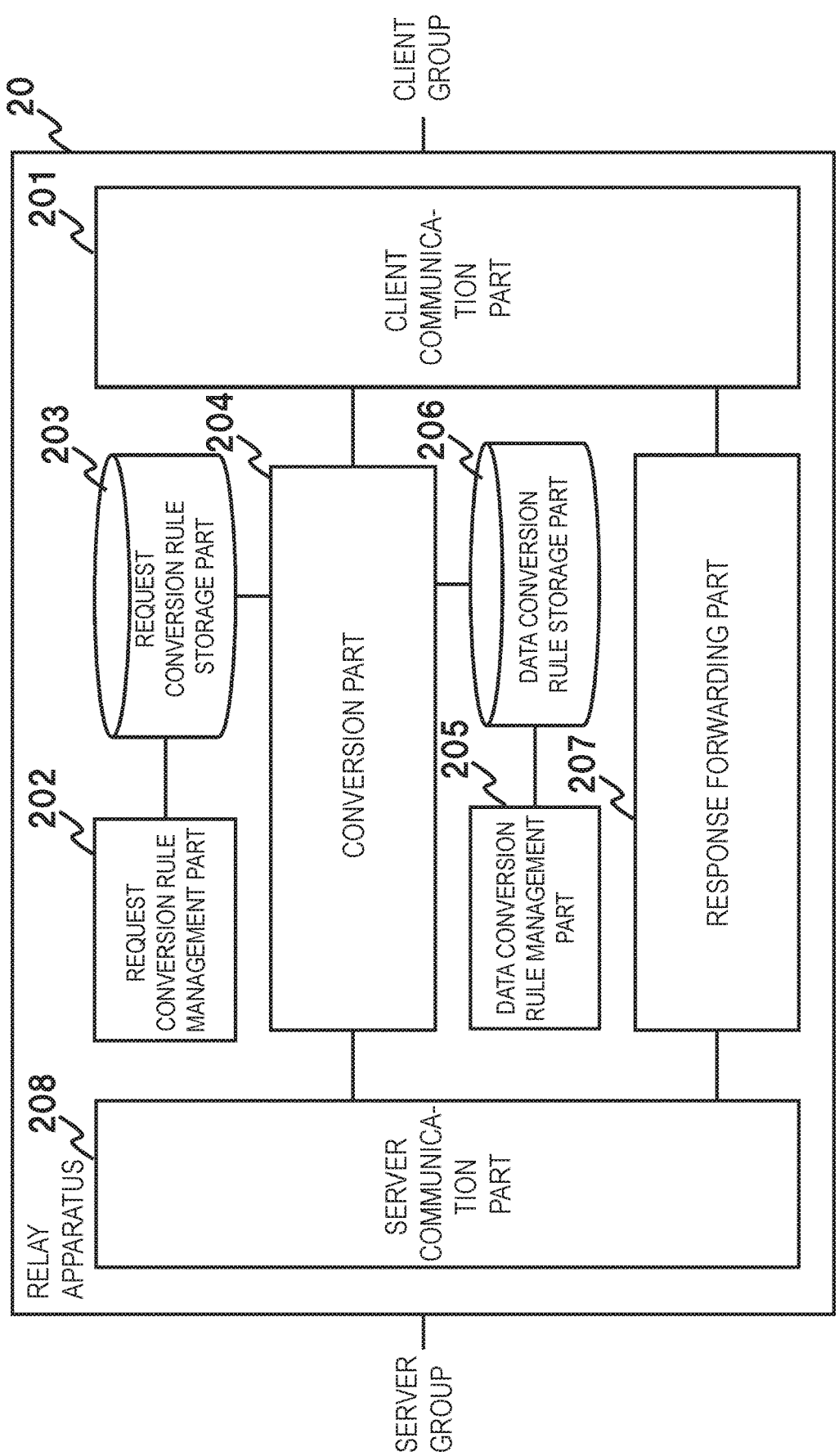
FIG. 4 illustrates a configuration of a relay apparatus according to the first example embodiment of the present disclosure.

FIG. 4 is a block diagram illustrating a detailed configuration of the relay apparatus 20 according to the first example embodiment of the present disclosure. As illustrated in FIG. 4, the relay apparatus 20 includes a client communication part 201, a request conversion rule management part 202, a request conversion rule storage part 203, a conversion part 204, a data conversion rule management part 205, a data conversion rule storage part 206, a response forwarding part 207, and a server communication part 208.

When the client communication part 201 receives an HTTP request from a client 10, the client communication part 201 forwards the content of the HTTP request to the conversion part 204. When the client communication part 201 receives converted data from the conversion part 204, the client communication part 201 forwards the content of the converted data to the client 10.

The request conversion rule management part 202 provides a function of managing a request conversion rule(s) stored in the request conversion rule storage part 203. The request conversion rule(s) is a rule(s) for converting an HTTP request(s) (a data acquisition request(s)) from a client(s) 10 into an HTTP request(s) for a server(s).

FIG. 5 illustrates an example of request conversion rules stored in the request conversion rule storage part 203. The top entry in FIG. 5 indicates the method name from a client 10="GET" and a rule indicating that a request Path="/api/v1/data" is converted into a server URI "https://10.0.0.1/api/v3/data". Likewise, the second entry from the top in FIG. 5 indicates the method name from the client 10="GET" and a rule indicating that a request with a query Path="/api/v1/data/{id}" (a query parameter in { }) is converted into a server URI "https://10.0.0.1/api/v3/data{id}".

Thus, when an administrator of the relay apparatus registers a new request conversion rule in the request conversion rule storage part 203 via the request conversion rule management part 202, the relay apparatus 20 can accommodate the Web API service of the new server 30. Of course, when the Web API specification of a certain server 30 changes, by updating the content of the request conversion rule storage part 203, the change of the Web API specification can be accommodated. While the example in FIG. 5 illustrates only GET method conversion rules, by registering conversion rules of a POST method, etc., the relay apparatus 20 is allowed to perform conversion corresponding to the POST method, etc.

The data conversion rule management part 205 provides a function of managing a data conversion rule(s) stored in the data conversion rule storage part 206. Herein, the data conversion rule(s) is a rule(s) for converting data included in a response(s) corresponding to an HTTP request(s) from a server(s) 30.

FIG. 6 illustrates an example of data conversion rules stored in the data conversion rule storage part 206. The top entry in FIG. 6 indicates the method name from a client 10="GET" and a conversion rule applied to data transmitted in response to a request Path="/api/v1/data". The conversion rule [.[ ]I.id] in this case is described based on a rule jq (https://stedolan.github.io/jq/) known as a data conversion rule in JSON (JavaScript Object Notation) format (JavaScript is a registered trademark).

The conversion rule [.[ ]I.id] in FIG. 6 indicates processing (a conversion rule) for extracting all elements (objects) included in the array (.[ ]), extracting the values of a key "id" included in the individual objects (I.id), and transmitting the extracted values as an array (the outer [ ]).

For example, when the following data array is transmitted from a server 30, since only the values of the key id are extracted from the array, the array [1, 2] is outputted.

```
[
    {
        "id": 1,
        "message": "hello"
    },
    {
        "id": 2,
        "message": "world"
    }
]
```

The conversion rule [.[0:100][ ]I.message] in FIG. 6 indicates processing (a conversion rule) for extracting up to 100 elements (objects) included in the array from the top thereof (.[0:100][ ]), extracting values of a key "message" included in the individual objects (I.message), and transmitting the extracted values as an array (the outer [ ]).

For example, when the following data array is transmitted from the server 30, since only the values of the key message are extracted from the array, ["hello", "world"] is outputted.

```
[
    {
        "id": 1,
        "message": "hello"
    },
    {
        "id": 2,
        "message": "world"
    }
]
```

In this example, since two elements are included in the input array, the number of elements in the input array matches the number of elements in the output array. However, even when the number of elements included in the input array exceeds 100, the number of elements in the output array is 100.

The conversion part 204 converts a request from a client 10 by referring to the above request conversion rules and transmits the converted data to the server 30. In addition, the conversion part 204 converts a response transmitted from a server 30 by referring to the data conversions rule and transmits the converted data to the client.

In addition, the conversion part 204 according to the present example embodiment has a function of extracting, when receiving an HTTP request from a client 10, a corresponding data conversion rule from the data conversion rule storage part 206 under a predetermined condition(s), transmitting the extracted data conversion rule to the client 10, and requesting the client 10 to perform data conversion. For example, whether the client has the function of converting the data in accordance with the extracted data conversion rule is used as one of the predetermined conditions. Whether the relay apparatus 20 has sufficient resources (a CPU (a central processing unit) and a memory) is used as another one of the predetermined conditions.

When the conversion part 204 requests the client 10 to perform data conversion, the response forwarding part 207 forwards the data received from the server 30 without converting the data (stream transmission).

The server communication part 208 forwards a URI converted by the conversion part 204 to the corresponding server 30. In addition, when the server communication part 208 receives data from a server 30, depending on the content of the data, the server communication part 208 forwards the data to the conversion part 204 or the response forwarding part 207.

Figure 7:
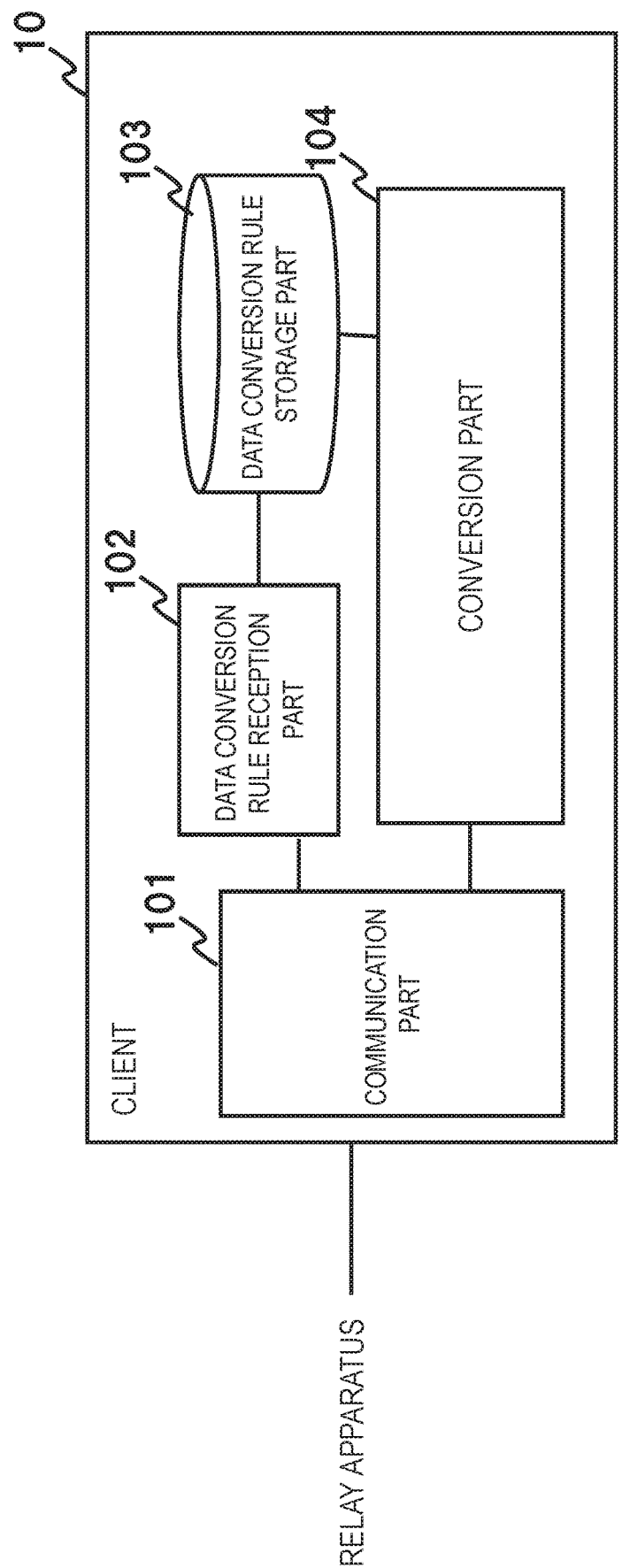
FIG. 7 illustrates a configuration of a client apparatus according to the first example embodiment of the present disclosure.

Next, a configuration of a client 10 that can accept the request of the data conversion will be described. FIG. 7 illustrates a configuration of a client 10 according to the first example embodiment of the present disclosure. As illustrated in FIG. 7, the client 10 includes a communication part 101, a data conversion rule reception part 102, a data conversion rule storage part 103, and a conversion part 104.

The communication part 101 transmits an HTTP request to the relay apparatus 20 and receives a response from the relay apparatus 20. In addition, when the communication part 101 receives a data conversion rule from the relay apparatus 20, the communication part 101 transmits the data conversion to the rule reception part 102.

The data conversion rule reception part 102 stores the data conversion rule transmitted from the relay apparatus 20 in the data conversion rule storage part 103. The data conversion rule stored in the data conversion rule storage part 103 is the same as that stored in the data conversion rule storage part 206 in the relay apparatus 20 (see FIG. 6).

The conversion part 104 refers to the data conversion rule storage part 103 and performs conversion processing only on the data that matches a condition(s) among the data transmitted from the relay apparatus 20. The content of the conversion processing is the same as the data conversion processing performed by the relay apparatus 20.

Figure 14:
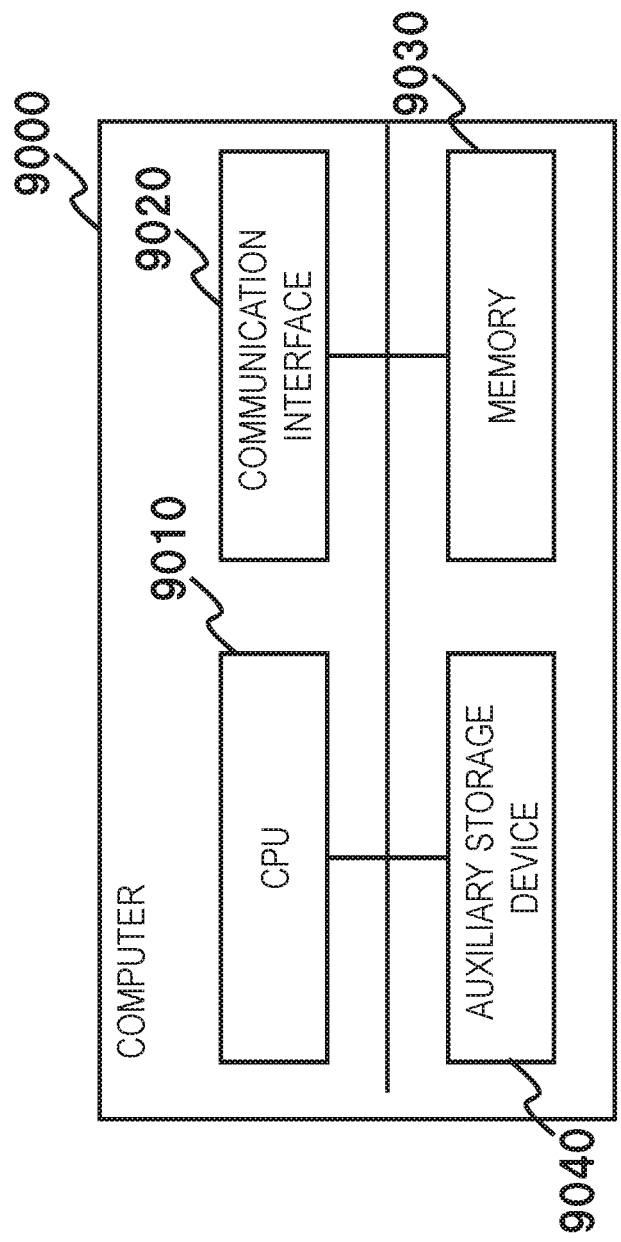
FIG. 14 illustrates a configuration of a computer mounted on a relay apparatus or a client according to the present disclosure.

Each unit (processing means) in a relay apparatus or a client illustrated in FIG. 1, 4, or 7 can be realized by a computer program that causes a computer (9000 in FIG. 14) that constitutes a corresponding one of the apparatuses to execute the corresponding one of the above processing by using its hardware (a processor, a memory, an auxiliary storage device, etc.). For example, this computer includes a CPU (a central processing unit) 9010, a communication interface 9020, a memory 9030, and an auxiliary storage device 9040 in FIG. 14. For example, the CPU 9010 in FIG. 14 may be configured to execute a program that realizes the function of the relay apparatus, to perform the individual processing described above.

Figure 8:
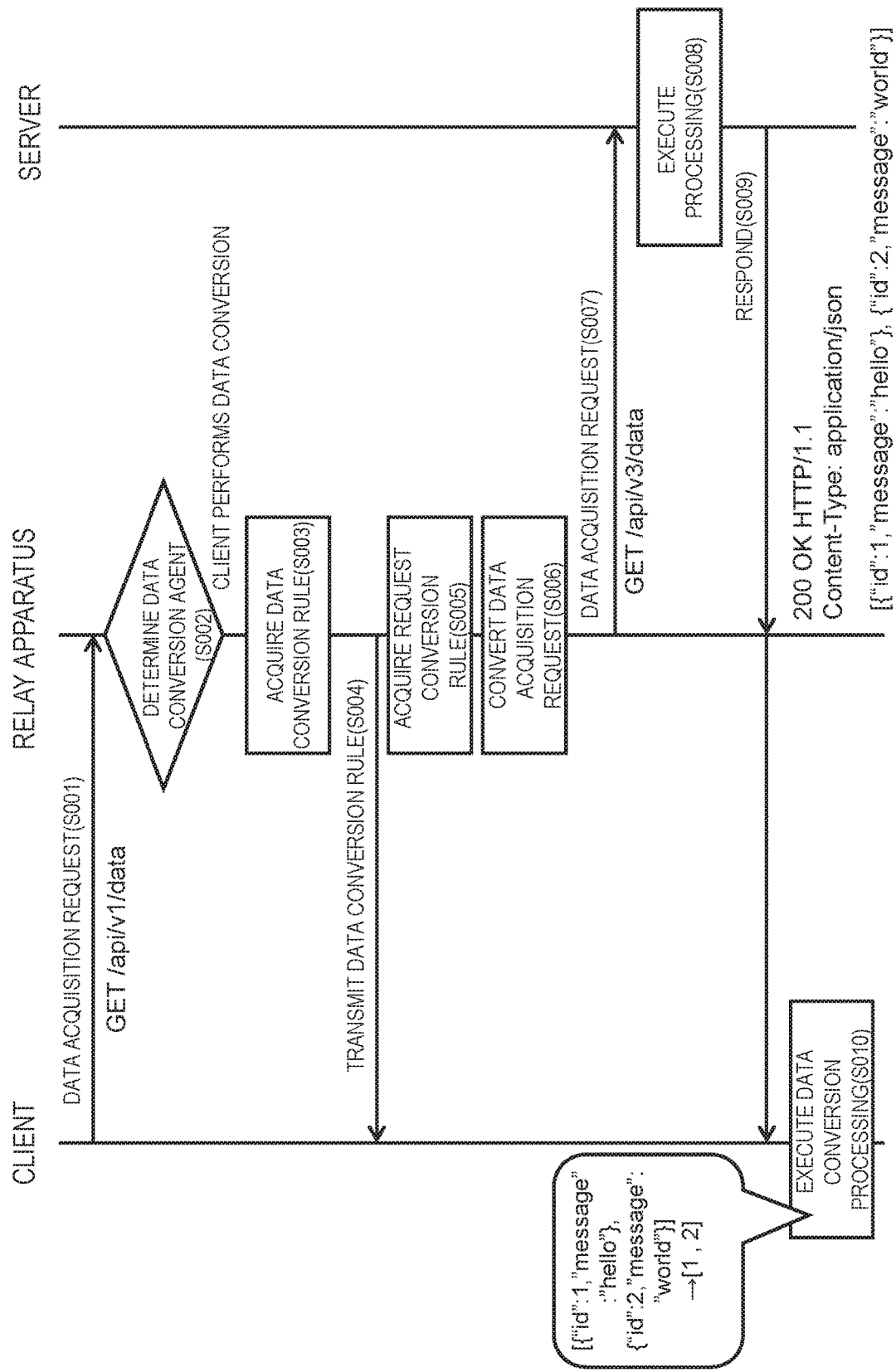
FIG. 8 is a sequence diagram illustrating an operation according to the first example embodiment of the present disclosure.

Next, operations according to the present example embodiment will be described in detail with reference to drawings. FIG. 8 is a sequence diagram illustrating an operation according to the first example embodiment of the present disclosure. As illustrated in FIG. 8, first, a client 10 transmits a data acquisition request to the relay apparatus 20 (step S001).

When the relay apparatus 20 receives the data acquisition request, the relay apparatus 20 determines whether to request the client 10 to perform data conversion, for example, based on whether the client 10 can perform the data conversion and its own resource statuses (step S002). In the example in FIG. 8, since the relay apparatus 20 determines to request the client 10 to perform the data conversion, the relay apparatus 20 extracts a data conversion rule, which matches the data acquisition request from the client 10, from the data conversion rule storage part 206 (step S003). Next, the relay apparatus 20 transmits the extracted data conversion rule to the client 10 (step S004).

Next, the relay apparatus 20 extracts a request conversion rule, which matches the data acquisition request from the client 10, from the request conversion rule storage part 203 (step S005) and converts the data acquisition request received from the client 10 (step S006). Next, the relay apparatus 20 transmits the converted data acquisition request to the server 30 (step S007).

When the server 30 receives the data acquisition request, the server 30 performs processing, for example, for extracting and rearranging the data specified by the data acquisition request (step S008). Next, the server 30 transmits response data (step S009). In the example in FIG. 8, since the relay apparatus 20 determines to request the client 10 to perform the data conversion, the relay apparatus 20 directly transmits the response data transmitted from the server 30 to the client 10 without converting the response data. The client 10 converts the data transmitted from the server 30 by using the data conversion rule received from the relay apparatus in step S004 (step S010).

As described above, according to the present example embodiment, the relay apparatus 20 can omit the conversion processing on the data transmitted from the server. In particular, in the case of a Web API, depending on a query parameter from a client, there are cases in which a large amount of data needs to be forward. Even in such cases, insufficiency of a memory, etc. of the relay apparatus 20 is not caused. Thus, for this reason, the circumstance in which the data cannot be transmitted to the client 10 occurs less frequently.

Figure 9:
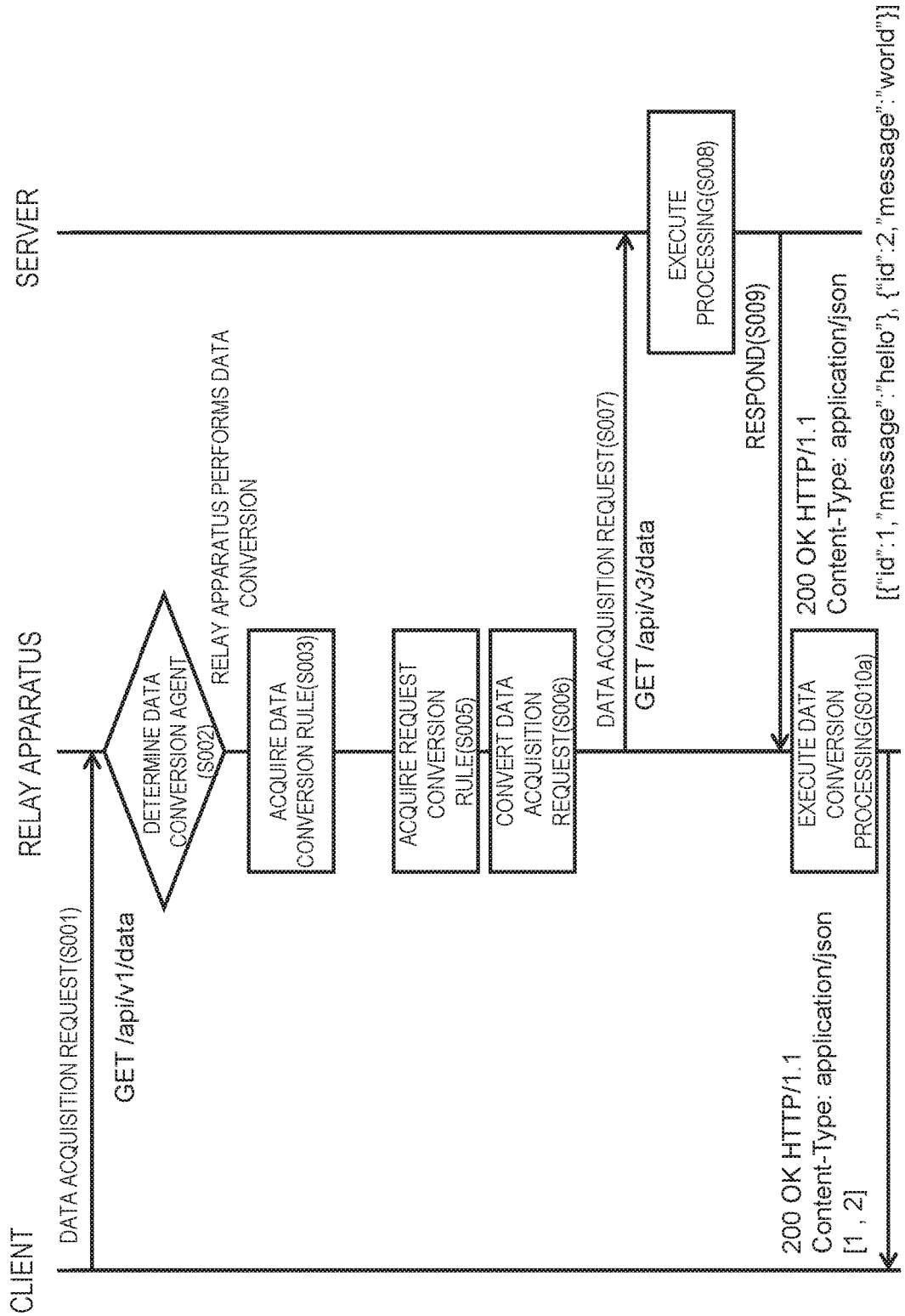
FIG. 9 is a sequence diagram illustrating an operation according to the first example embodiment of the present disclosure.

FIG. 9 illustrates an operation performed when the relay apparatus 20 determines not to request the client 10 to perform the data conversion in step S002 in FIG. 8. The difference from FIG. 8 is that the processing for transmitting the data conversion rule to the client 10 is omitted and that the relay apparatus 20 performs the data conversion processing (step S010*a*) and transmits the converted data to the client 10. As described above, according to the present example embodiment, depending on the resource usage statuses of or the load on the relay apparatus 20, the agent that performs the data conversion processing can be switched.

In addition, the above description has been made by using an example in which the data conversion rule is described based on jq. However, an arbitrary method can be used as the description method of the data conversion rule. For example, as the description method of the data conversion rule, a regular expression, JsonLogic (http://jsonlogic.com/), etc. may be used.

Second Example Embodiment

Figure 10:
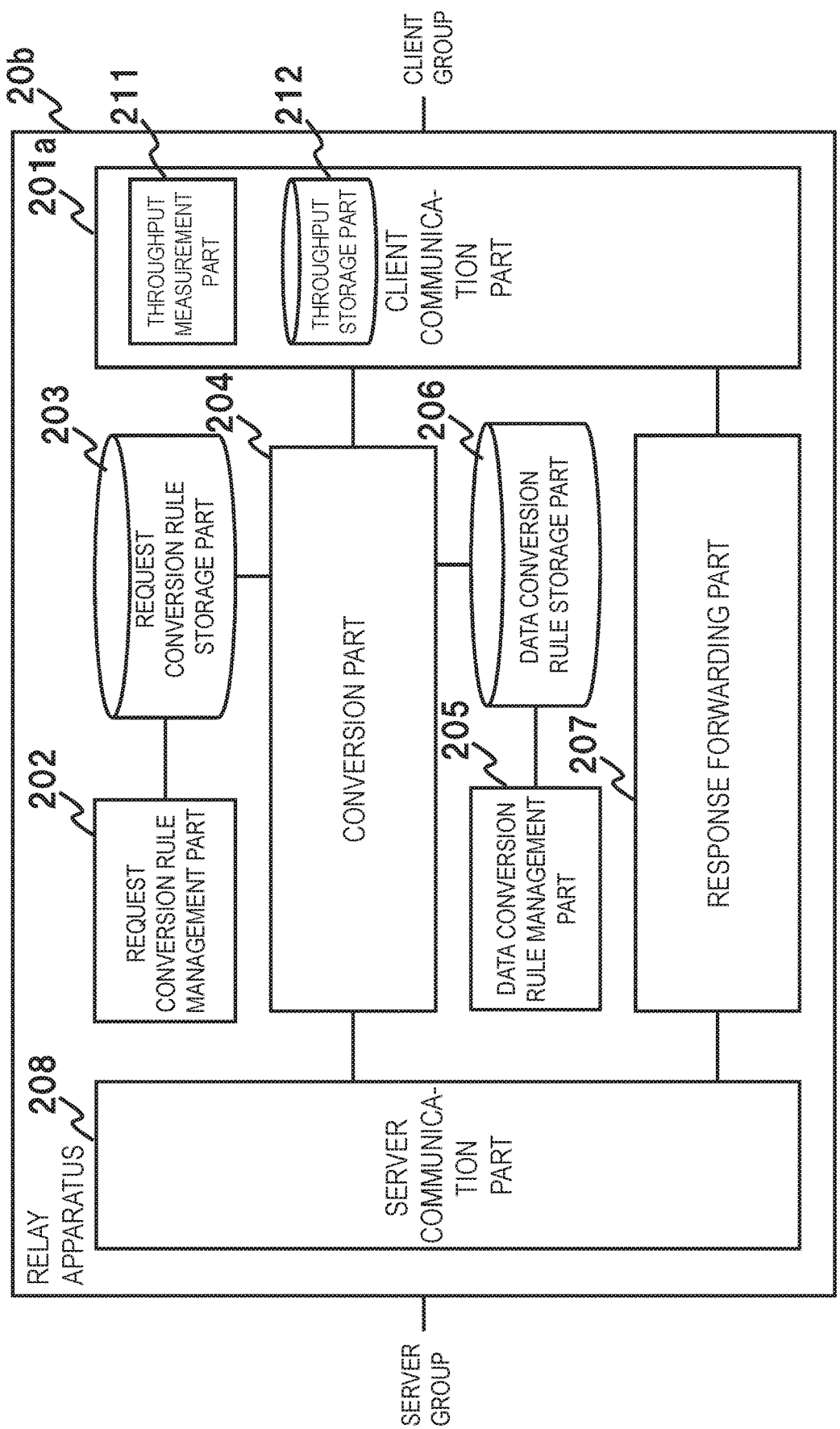
FIG. 10 illustrates a configuration of a relay apparatus according to a second example embodiment of the present disclosure.

Next, a second example embodiment will be described with reference to drawings. The second example embodiment differs from the first example embodiment in the condition(s) used by the relay apparatus 20 to determine whether to request a client 10 to perform data conversion. FIG. 10 illustrates a configuration of a relay apparatus according to the second example embodiment of the present disclosure. A relay apparatus 20*b* according to the second example embodiment differs from the relay apparatus 20 according to the first example embodiment illustrated in FIG. 4 is that a client communication part 201*a* of the relay apparatus 20*b* includes: a throughput measurement part 211 that measures an effective throughput(s) of a communication path(s) between the client(s) 10 and the relay apparatus 20*b*; and a throughput storage part 212 that holds the measured throughput(s) for a predetermined period. Since other aspects of the configuration are the same as those according to the first example embodiment, the following description will be made with a focus on the differences.

The throughput measurement part 211 measures the effective throughput(s) of a communication path(s) between the client(s) 10 and the relay apparatus 20*b* at predetermined time intervals and stores the effective throughput(s) in the throughput storage part 212. To measure an effective throughput, the time between when the throughput measurement part 211 transmits a measurement packet to a client 10 and when the throughput measurement part 211 receives a response from the client 10 may be measured.

When the relay apparatus 20*b* receives a data acquisition request from a client 10, a conversion part 204 according to the present example embodiment refers to information about the throughput between the relay apparatus 20*b* and the client 10 stored in the throughput storage part 212 and determines whether to request this client 10 to perform data conversion.

For example, when the effective throughput of a communication path between the relay apparatus 20*b* and a certain client 10 is higher than a predetermined threshold, the conversion part 204 determines that the relay apparatus 20*b* performs the data conversion without requesting the client 10 to perform the data conversion. This is because, when the effective throughput of the communication path between the relay apparatus 20*b* and the client 10 is high, since the relay apparatus 20*b* can transmit the converted data to the client 10 at high speed, the time when the memory of the relay apparatus 20*b* is occupied is short.

In contrast, when the effective throughput of the communication path between the relay apparatus 20*b* and the certain client 10 is equal to or less than the predetermined threshold, the conversion part 204 determines to request the client 10 to perform the data conversion. This is because, when the effective throughput of the communication path between the relay apparatus 20*b* and the client 10 is low, since the transmission time of the data to the client 10 is extended, the time when the memory of the relay apparatus 20*b* is occupied is also extended.

Figure 11:
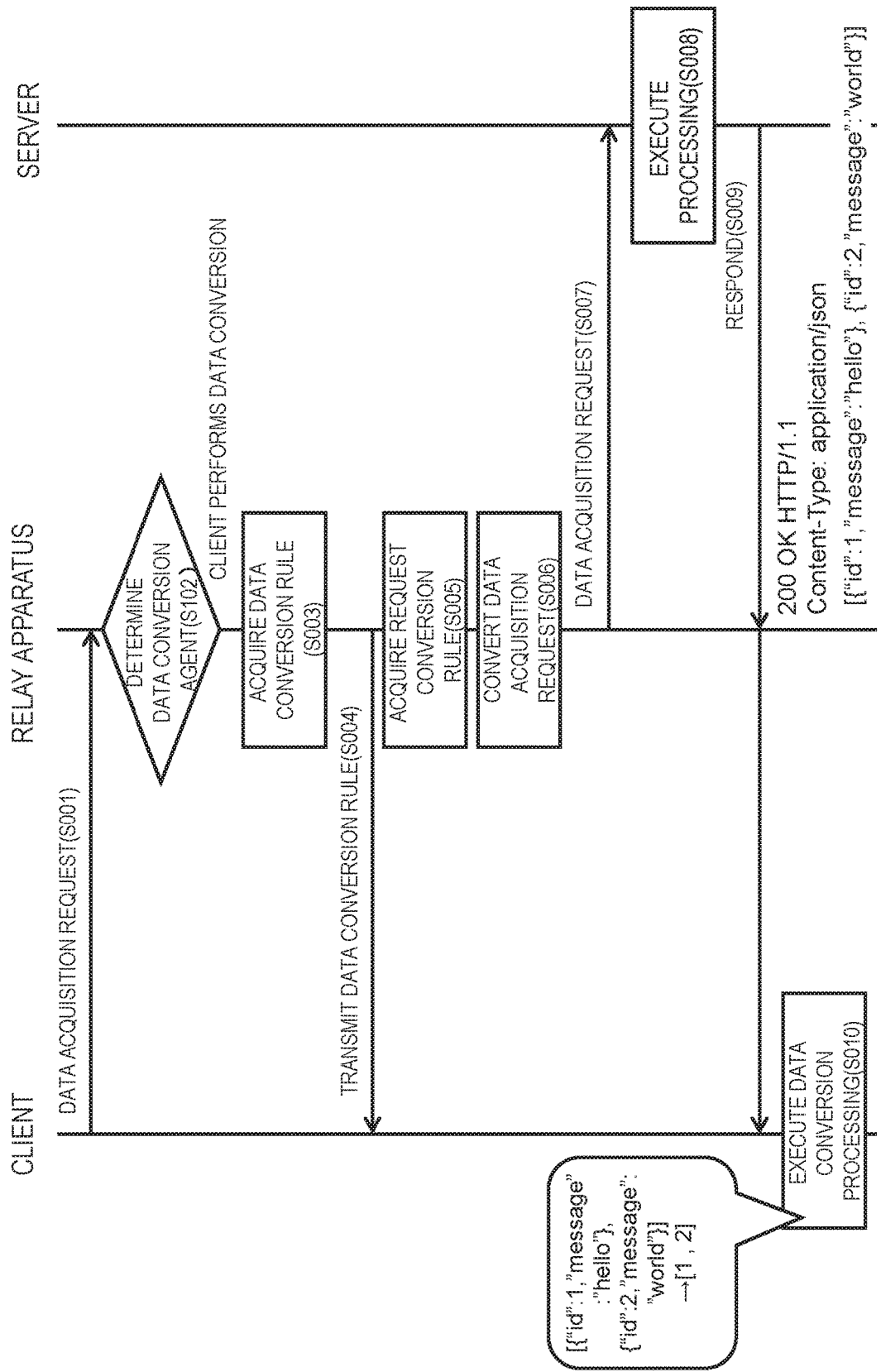
FIG. 11 is a sequence diagram illustrating an operation according to the second example embodiment of the present disclosure.
Figure 12:
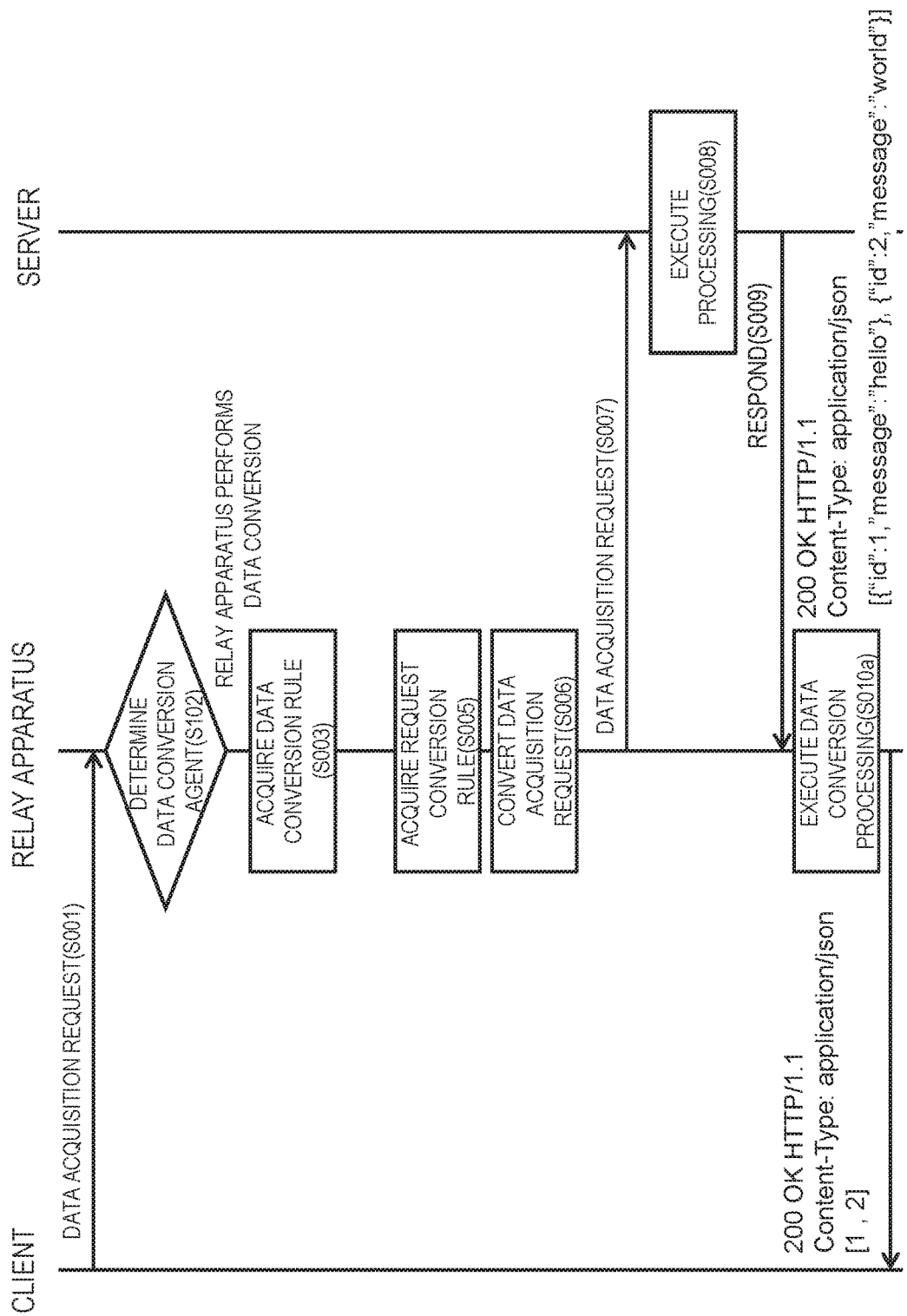
FIG. 12 is a sequence diagram illustrating an operation according to the second example embodiment of the present disclosure.

FIGS. 11 and 12 are sequence diagrams illustrating operations according to the second example embodiment. Basic operations are the same as those according to the first example embodiment. The operations according to the second example embodiment differ from those according to the first example embodiment in that the determination of the data conversion agent in step S102 is made based on the throughput information.

As described above, according to the present example embodiment in which the data conversion agent is switched depending on the throughput, the relay apparatus 20*b* can request the client 10 to perform data conversion processing that is likely to extend the time when the memory of the relay apparatus 20*b* is occupied. As a result, the overall performance can be improved.

In the above description, when the effective throughput is high, the relay apparatus 20*b* does not request the client 10 to perform the data conversion. In contrast, when the effective throughput is low, the relay apparatus 20*b* requests the client 10 to perform the data conversion. However, the opposite operation is possible, depending on the balance of the processing capability of the relay apparatus 20*b* and the capability of data forwarding in the communication path by the client 10 and the relay apparatus 20*b*. For example, when the effective throughput is extremely high (when the effective throughput is higher than a second threshold higher than the above threshold), the relay apparatus 20*b* can transmit the data to the client 10 at high speed by requesting the client 10 to perform the data conversion.

Of course, according to the present example embodiment, whether to request the client 10 to perform the data conversion may comprehensively be determined in view of not only the throughput but also the available resource status, etc. of the relay apparatus 20*b*.

Third Example Embodiment

Figure 13:
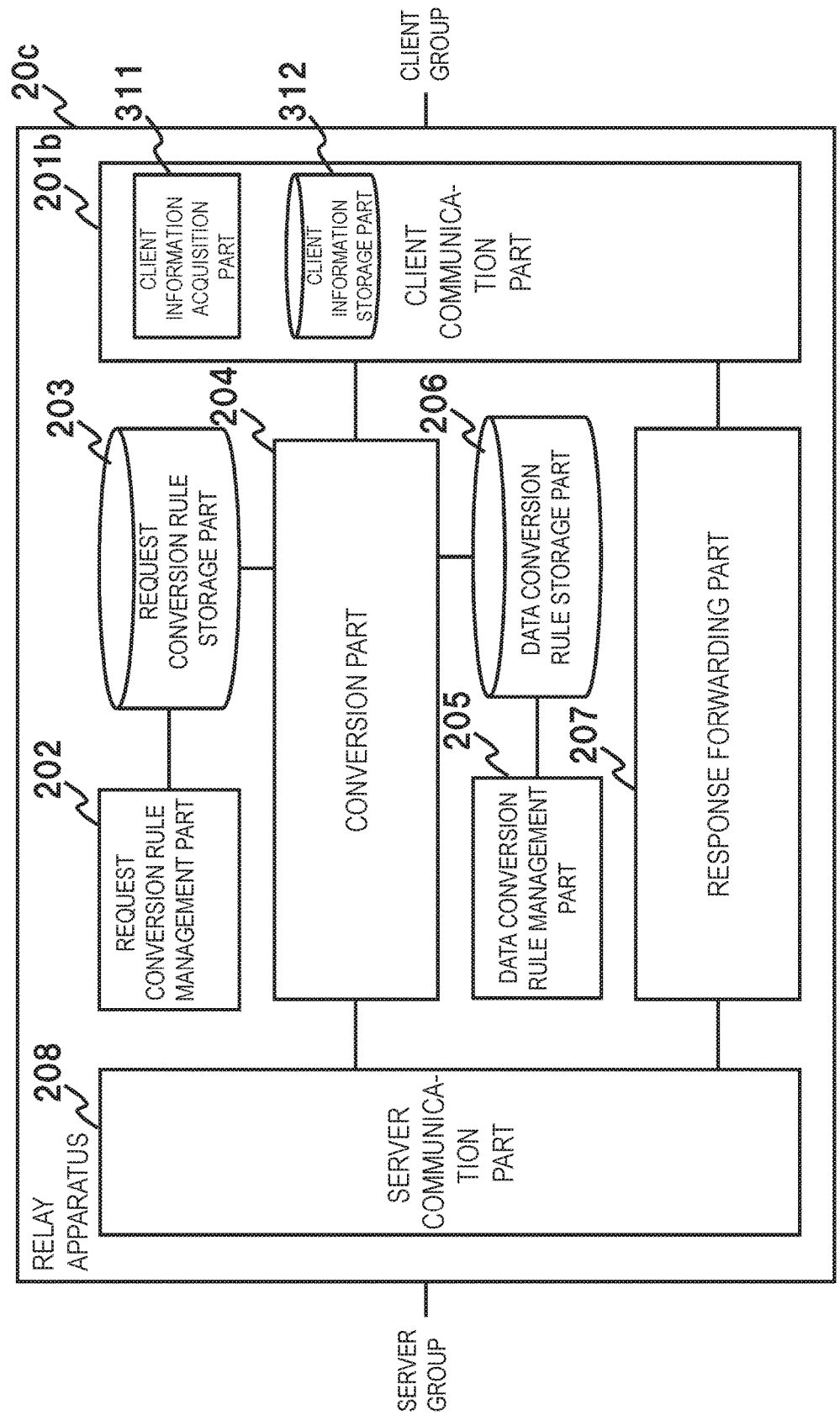
FIG. 13 illustrates a configuration of a relay apparatus according to a third example embodiment of the present disclosure.

Next, a third example embodiment will be described with reference to a drawing. According to the third example embodiment, a relay apparatus 20*c* uses an index(es) relating to a data conversion performance(s) of a client(s) to determine whether to request the client(s) 10 to perform data conversion. FIG. 13 illustrates a configuration of the relay apparatus according to the third example embodiment of the present disclosure. The relay apparatus 20*c* according to the third example embodiment differs from the relay apparatus 20 according to the first example embodiment illustrated in FIG. 4 in that a client communication part 201*b* of the relay apparatus 20*c* includes a client information acquisition part 311 that acquires the available memory amount(s), the CPU performance(s), etc. of the client(s) 10 and a client information storage part 312 that holds the acquired client information. Since other aspects of the configuration are the same as those according to the first example embodiment, the following description will be made with a focus on the differences.

The client information acquisition part 311 communicates with a client 10 and acquires the CPU performance, the available memory amount, etc. as the performance index(es) relating to the data conversion performance and stores the performance index(es) in the client information storage part 312. The available memory amount varies depending on, for example, the number of programs operating on the client 10. Thus, it is preferable that the relay apparatus 20*c* communicate with the client 10 at predetermined intervals and acquire the latest available memory amount, etc.

When the relay apparatus 20*c* receives a data acquisition request from the client 10, a conversion part 204 according to the present example embodiment refers to the CPU performance and the available memory amount of the client 10 stored in the client information storage part 312 and determines whether to request the client 10 to perform the data conversion.

For example, when an index value representing the CPU performance of a certain client 10 is higher than a predetermined reference value and when the available memory amount is larger than a predetermined threshold, the conversion part 204 determines to request the client 10 to perform the data conversion. In contrast, when the CPU performance of the certain client 10 is low or when the available memory amount is small, the conversion part 204 determines not to request the client 10 to perform the data conversion.

The reason why the conversion part 204 determines not to request the client 10 to perform the data conversion when the CPU performance of the client 10 is low or when the available memory is not sufficient is that, if the conversion part 204 requests the client to perform the data conversion, the time needed until completion of the data conversion is extended and the user will have the impression that the data forwarding is slow.

As described above, according to the present example embodiment in which the data conversion agent is switched depending on the performance or the available memory amount of the client, the average TAT (turnaround time) until completion of the data conversion can be shortened. As a result, the overall performance can be improved.

Of course, according to the present example embodiment, whether to request the client 10 to perform the data conversion may comprehensively be determined in view of not only the performance and the available memory amount of the client but also the available resource status of the relay apparatus 20c and/or the throughput used in the second example embodiment.

While example embodiments of the present invention have thus been described, the present invention is not limited thereto. Further variations, substitutions, or adjustments can be made without departing from the basic technical concept of the present invention. For example, the configurations of the networks, the configurations of the elements, and the representation modes of the messages illustrated in the drawings have been used only as examples to facilitate understanding of the present invention. Namely, the present invention is not limited to the configurations illustrated in the drawings.

For example, in the above example embodiments, the individual client 10, the relay apparatus 20, and the individual server 30 are physically separately arranged. However, a mode in which the relay apparatus 20 and the individual server 30 are integrated may be adopted. In addition, any one of or all of the individual client 10, the relay apparatus 20, and the individual server 30 may be configured by a VM (a virtual machine) that operates on a virtualized environment.

In addition, for example, in the above example embodiments, the request conversion rule management part 202 and the data conversion rule management part 205 are separately arranged in the relay apparatus 20. However, the request conversion rule management part 202 and the data conversion rule management part 205 may be integrated. In addition, an external terminal or the like may be provided with a function corresponding to the request conversion rule management part 202 and the data conversion rule management part 205, and the external terminal may be configured to directly update the contents of the request conversion rule storage part 203 and the data conversion rule storage part 206.

Finally, suitable modes of the present invention will be summarized.
[Mode 1]
(See the relay apparatus according to the above first aspect)
[Mode 2]
The above relay apparatus may include a request conversion rule storage part configured to hold a request conversion rule(s) for converting a data acquisition request(s) transmitted from the data request source(s) into a data acquisition request(s) that matches the data provision apparatus(es). The data request part may refer to the request conversion rule storage part and convert the data acquisition request(s) transmitted from the data request source(s) into a data acquisition request(s) that matches the data provision apparatus(es).
[Mode 3]
The above relay apparatus may further include:
a data conversion rule storage part configured to hold a conversion rule(s) for the data; and
a data conversion part configured to convert data transmitted from the data provision apparatus(es);
wherein, when the relay apparatus receives a predetermined data acquisition request(s) from the data request source(s), the relay apparatus converts the data received from the data provision apparatus(es) instead of instructing the data request source(s) to convert the data.
[Mode 4]
The above relay apparatus may include:
a throughput measurement part configured to measure a throughput(s) between the data request source(s) and the relay apparatus;
wherein the relay apparatus determines whether to convert the data received from the data provision apparatus(es), based on the throughput(s).
[Mode 5]
When the throughput(s) is lower than a predetermined threshold, the above relay apparatus may transmit a conversion rule(s) for the data transmitted from the data provision apparatus(es) to the data request source(s) and instruct the data request source(s) to convert the data transmitted from the data provision apparatus(es).
[Mode 6]
The above relay apparatus may monitor a predetermined performance index(es) relating to a data conversion performance(s) of the data request source(s), and when the predetermined performance index(es) relating to the data conversion performance(s) of the data request source(s) is higher than a predetermined threshold, the relay apparatus may instruct the data request source(s) to convert the data transmitted from the data provision apparatus(es).
[Mode 7]
The above relay apparatus may relay data exchange between a server(s) that provides a service(s) by using a Web API(s) and a client(s) via the Internet.
[Mode 8]
(See the client apparatus according to the above second aspect)
[Mode 9]
(See the data relay method according to the third aspect)
[Mode 10]
(See the program according to the above fourth aspect)
The above modes 8 and 10 can be expanded in the same way as mode 1 is expanded to modes 2 to 7.

The disclosure of each of the above PTLs is incorporated herein by reference thereto. Variations and adjustments of the example embodiments and the examples are possible within the scope of the overall disclosure (including the claims) of the present invention and based on the basic technical concept of the present invention. Various combinations and selections of various disclosed elements (including the elements in the claims, example embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10 client
10A data request source
20, 20A, 20b, 20c relay apparatus
21A data request part
22A conversion instruction part
23A data forwarding part
30 server
30A data provision apparatus
101 communication part
102 data conversion rule reception part
103 data conversion rule storage part
104 conversion part
201, 201a, 201b client communication part
202 request conversion rule management part
203 request conversion rule storage part
204 conversion part
205 data conversion rule management part
206 data conversion rule storage part
207 response forwarding part
208 server communication part
211 throughput measurement part
212 throughput storage part
311 client information acquisition part
312 client information storage part

What is claimed is:

1. A relay apparatus, comprising:
a processor and a memory storing an instruction program that causes the processor to perform:
requesting, based on a data acquisition request from a data request source, a data provision apparatus that provides data by using a predetermined application programming interface to transmit data;
transmitting a conversion rule for data transmitted from the data provision apparatus to the data request source and instructs the data request source to convert the data transmitted from the data provision apparatus; and
forwarding data transmitted from the data provision apparatus to the data request source.

2. The relay apparatus according to claim 1, wherein the instruction program further causes the processor to perform:
holding a request conversion rule for converting a data acquisition request transmitted from the data request source into a data acquisition request that matches the data provision apparatus;
wherein the requesting refers to the holding and converts the data acquisition request transmitted from the data request source into a data acquisition request that matches the data provision apparatus.

3. The relay apparatus according to claim 1, wherein the instruction program further causes the processor to perform:
holding a conversion rule for the data; and
converting data transmitted from the data provision apparatus;
wherein, when the relay apparatus receives a predetermined data acquisition request from the data request source, the relay apparatus converts the data received from the data provision apparatus instead of instructing the data request source to convert the data.

4. The relay apparatus according to claim 1, wherein the instruction program further causes the processor to perform:
measuring a throughput between the data request source and the relay apparatus;
wherein the relay apparatus determines whether to convert the data received from the data provision apparatus, based on the throughput.

5. The relay apparatus according to claim 4; wherein, when the throughput is lower than a predetermined threshold, the relay apparatus transmits a conversion rule for the data transmitted from the data provision apparatus to the data request source and instructs the data request source to convert the data transmitted from the data provision apparatus.

6. The relay apparatus according to claim 1;
wherein the relay apparatus monitors a predetermined performance index relating to a data conversion performance of the data request source; and
wherein, when the predetermined performance index relating to the data conversion performance of the data request source is higher than a predetermined threshold, the relay apparatus instructs the data request source to convert the data transmitted from the data provision apparatus.

7. The relay apparatus according to claim 1; wherein the application programming interface is a Web API.

8. A data relay method, comprising:
requesting, based on a data acquisition request from a data request source, a data provision apparatus that provides data by using a predetermined application programming interface to transmit data;
transmitting a conversion rule for data transmitted from the data provision apparatus to the data request source;
forwarding data transmitted from the data provision apparatus to the data request source; and
instructing the data request source to convert the data transmitted from the data provision apparatus.

9. A non-transitory computer-readable recording medium storing thereon a program storage medium in which a computer-readable program is stored, the program causing a computer, which constitutes a relay apparatus that requests, based on a data acquisition request from a data request source, a data provision apparatus that provides data by using a predetermined application programming interface to transmit data, to perform processing for:
requesting, based on the data acquisition request from the data request source, the data provision apparatus to transmit data by using the predetermined application programming interface;
transmitting a conversion rule for data transmitted from the data provision apparatus to the data request source; and
forwarding data transmitted from the data provision apparatus to the data request source.

10. The relay apparatus according to claim 2, wherein the instruction program further causes the processor to perform:
holding a conversion rule for the data; and
converting data transmitted from the data provision apparatus;

wherein, when the relay apparatus receives a predetermined data acquisition request from the data request source, the relay apparatus converts the data received from the data provision apparatus instead of instructing the data request source to convert the data.

11. The relay apparatus according to claim 2, wherein the instruction program further causes the processor to perform:
measuring a throughput between the data request source and the relay apparatus;
wherein the relay apparatus determines whether to convert the data received from the data provision apparatus, based on the throughput.

12. The relay apparatus according to claim 3, wherein the instruction program further causes the processor to perform:
measuring a throughput between the data request source and the relay apparatus;
wherein the relay apparatus determines whether to convert the data received from the data provision apparatus, based on the throughput.

13. The relay apparatus according to claim 11; wherein, when the throughput is lower than a predetermined threshold, the relay apparatus transmits a conversion rule for the data transmitted from the data provision apparatus to the data request source and instructs the data request source to convert the data transmitted from the data provision apparatus.

14. The relay apparatus according to claim 12; wherein, when the throughput is lower than a predetermined threshold, the relay apparatus transmits a conversion rule for the data transmitted from the data provision apparatus to the data request source and instructs the data request source to convert the data transmitted from the data provision apparatus.

15. The relay apparatus according to claim 2;
wherein the relay apparatus monitors a predetermined performance index relating to a data conversion performance of the data request source; and
wherein, when the predetermined performance index relating to the data conversion performance of the data request source is higher than a predetermined threshold, the relay apparatus instructs the data request source to convert the data transmitted from the data provision apparatus.

16. The relay apparatus according to claim 3;
wherein the relay apparatus monitors a predetermined performance index relating to a data conversion performance of the data request source; and
wherein, when the predetermined performance index relating to the data conversion performance of the data request source is higher than a predetermined threshold, the relay apparatus instructs the data request source to convert the data transmitted from the data provision apparatus.

17. The relay apparatus according to claim 4;
wherein the relay apparatus monitors a predetermined performance index relating to a data conversion performance of the data request source; and
wherein, when the predetermined performance index relating to the data conversion performance of the data request source is higher than a predetermined threshold, the relay apparatus instructs the data request source to convert the data transmitted from the data provision apparatus.

18. The relay apparatus according to claim 5;
wherein the relay apparatus monitors a predetermined performance index relating to a data conversion performance of the data request source; and
wherein, when the predetermined performance index relating to the data conversion performance of the data request source is higher than a predetermined threshold, the relay apparatus instructs the data request source to convert the data transmitted from the data provision apparatus.

19. The relay apparatus according to claim 2; wherein the application programming interface is a Web API.

* * * * *